US 8,631,727 B2

(12) United States Patent
    Nakagawa

(10) Patent No.: US 8,631,727 B2
(45) Date of Patent: Jan. 21, 2014

(54) MACHINE TOOL

(75) Inventor: Atsushi Nakagawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 91 days.

(21) Appl. No.: 13/456,332

(22) Filed: Apr. 26, 2012

(65) Prior Publication Data

US 2013/0104707 A1 May 2, 2013

Related U.S. Application Data

(63) Continuation of application No. PCT/JP2010/068432, filed on Oct. 20, 2010.

(30) Foreign Application Priority Data

Nov. 2, 2009 (JP) .................................. 2009-251736

(51) Int. Cl.
    *B23Q 17/22* (2006.01)
(52) U.S. Cl.
    USPC .................... 82/118; 82/121; 82/134; 82/142; 82/900; 33/626
(58) Field of Classification Search
    USPC ........... 82/118, 120, 121, 132, 133, 134, 142, 82/900; 33/626, 628, 629, 630, 638, 642
    See application file for complete search history.

(56) References Cited

U.S. PATENT DOCUMENTS

| 4,561,058 | A  | * | 12/1985 | McMurtry | ..................... | 700/195 |
| 5,623,857 | A  | * | 4/1997  | Sakuraba | ..................... | 82/1.11 |
| 6,615,697 | B2 | * | 9/2003  | Nakagawa | ..................... | 82/118  |
| 2002/0059851 | A1 | | 5/2002 | Nakagawa | | |

FOREIGN PATENT DOCUMENTS

| DE | 2432671 A1 | * | 10/1974 |
| DE | 4238504 A1 | * | 5/1994 |
| DE | 102008046940 A1 | * | 3/2010 |
| JP | 10-277889 A | | 10/1998 |
| JP | 11090788 A | * | 4/1999 |
| JP | 2001-144191 A | | 5/2001 |
| JP | 2002-144191 A | | 5/2002 |
| JP | 2004-322255 A | | 11/2004 |
| JP | 2009028819 A | * | 2/2009 |

OTHER PUBLICATIONS

Official Communication issued in International Patent Application No. PCT/JP2010/068432, mailed on Jan. 11, 2011.
English translation of Official Communication issued in corresponding International Application PCT/JP2010/068432, mailed on Jun. 21, 2012.

* cited by examiner

*Primary Examiner* — Daniel Howell
*Assistant Examiner* — Nicole N Ramos
(74) *Attorney, Agent, or Firm* — Keating & Bennett, LLP

(57) ABSTRACT

A machine tool includes a spindle side position measuring unit measuring a spindle axial position in a spindle radial direction relative to a first reference position and a tool side position measuring unit measuring the position of a tool post relative to a second reference position. The spindle side position measuring unit includes a first scale extending in the spindle radial direction and a first readout unit, one of a base end portion of the first scale and the first readout unit is disposed at a spindle axis and the other of the base end portion of the first scale and the first readout unit is disposed at the first reference position. One of a base end portion of a second scale and a second readout unit is disposed on the tool post and the other is disposed at the second reference position.

11 Claims, 10 Drawing Sheets

MACHINE TOOL

CROSS REFERENCE TO THE RELATED APPLICATION

This application is a continuation application, under 35 U.S.C. §111(a) of international application No. PCT/JP2010/068432, filed Oct. 20, 2010, which claims priority to Japanese Patent Application No. 2009-251736, filed Nov. 2, 2009, the entire disclosure of which is herein incorporated by reference as a part of this application.

BACKGROUND OF THE INVENTION

1. Field of the Invention

The present invention relates to a machine tool such as, for example, a turning machine, a drilling machine, or a grinding machine and, more particularly, to the machine tool equipped with a measuring function for correction of, for example, a thermal displacement.

2. Description of the Related Art

In a machine tool such as, for example, a turning machine, thermal expansion and/or thermal deformation tend to occur at a machine bed and various parts of the machine tool because of a cutting heat and/or heat emission from such various parts incident to the machine tool being operated. The occurrence of the thermal expansion and/or the thermal deformation referred to above tends to bring about a reduction in processing accuracy. Although as a countermeasure therefor, a cooling device has been used, the cooling device tends to become too huge and bulky to suppress the thermal expansion sufficiently, and also, only cooling is insufficient to secure a processing accuracy. For this reason, various suggestions have been made for correcting, for example, the cut-in quantity of a tool depending on the thermal displacement by measuring the thermal expansion.

By way of example, as shown in FIG. 12, the machine tool disclosed in the Japanese Laid-open Patent Publication No. 2002-144191 is a turning machine having a structure in which a headstock 51 is fixed in position on a machine bed 52 and a tailstock 54 having a tool post 53 mounted thereon is supported to move in a spindle radial direction (X-axis direction). The illustrated turning machine is structured such that the position of the tool post 53 in the spindle radial direction is measured by causing a readout unit 56, fitted to the tailstock 54, to read a scale 55 fitted to the headstock 51 so as to extend in a direction parallel to the spindle radial direction. The reading indicative of the position of the tool post 53 in the spindle radial direction changes with, for example, thermal displacement. Accordingly, a proper processing accuracy is secured at all times by correcting the cut-in amount of the tool 57 of the tool post 53 in dependence on the measured reading.

If only the relative position of the tailstock 54 relative to the headstock 51 is measured such as disclosed in the Japanese Laid-open Patent Publication No. 2002-144191 listed above, an error tends to occur between a spindle axis and the tool 57 in the event of occurrence of the thermal displacement of the tool post 53 relative to the tailstock 54. Also, since in the machine tool disclosed in the Japanese Laid-open Patent Publication No. 2002-144191 referred to above, the headstock 51 and the tailstock 54 for the tool post 53 are arranged having been juxtaposed in a direction parallel to the spindle radial direction and have respective directions of spindle axes thereof (Z-axis directions) held at the same positional relation, the scale 55 fitted to the headstock 51 can be readout by the readout unit 56 fitted to the tailstock 54. In the case of the machine tool having a structure in which the tool post is movable in both of the spindle radial direction and the spindle axial direction, however, the positional relationship between the headstock and the tailstock in the spindle axial direction does not remain the same at all times, neither the scale nor the readout unit cannot be provided in such a machine tool as hereinabove described. This is also true of the machine tool in which the tool post is fixed in position, but the headstock is movable in both of the spindle radial direction and the spindle axial direction and also true of the machine tool of a structure in which the headstock and the tool post are movable in the spindle direction and the spindle axial direction, respectively.

SUMMARY OF THE INVENTION

Preferred embodiments of the present invention provide a machine tool in which a distance between an axis of a spindle and a cutting edge of a tool with respect to a spindle radial direction can be measured accurately so that corrections can be made, and corrective actions can be performed in response to a change in dimension of the machine to ensure machine precision and achieve improved processing accuracy.

In addition, preferred embodiments of the present invention also provide a low cost measuring system provided in a machine tool that performs a required position measurement in dependence on a movement of either a headstock or a tool post.

Additional preferred embodiments of the present invention accurately correct a distance between an axis of a spindle and a cutter edge of a tool relative to a change in dimension of the machine of the type referred to above.

A machine tool according to a preferred embodiment of the present invention includes a headstock that rotatably supports a spindle including a tip provided with a chuck to hold a work, and a tool post having a tool fitted thereto, which are disposed on a machine bed to move relative to each other in a spindle radial direction and a spindle axial direction. The machine tool also includes a spindle side position measuring unit and a tool side position measuring unit. The spindle side position measuring unit includes a first scale extending in the spindle radial direction, and a first readout unit arranged to read the first scale and to measure a spindle axial position in the spindle radial direction relative to a first reference position, one of a base end portion of the first scale and the first readout unit being provided on a portion of the headstock or a member that is movable in the spindle radial direction together with the headstock in an area of the spindle axis in the spindle radial direction, and the other of the base end of the first scale and the first readout unit being provided at the first reference position. The tool side position measuring unit includes a second scale extending in the spindle radial direction, and a second readout unit arranged to read the second scale and to measure the position of the tool post relative to a second reference position, one of a base end portion of the second scale and the second readout unit being provided on the tool post or a member that is movable together with the tool post in the spindle radial direction, and the other of the base end portion of the second scale and the second readout unit being provided at the second reference position. The first reference position and the second reference position are fixed in position relative to the spindle radial direction.

The machine tool also preferably includes a calculating block arranged to calculate a relative distance between a spindle axis and a cutter edge that corresponds to a distance between the spindle axis and the cutter edge in the spindle radial direction, or to calculate a value used in correcting an amount of relative movement between the headstock and the tool post in the spindle radial direction based on a reading of the spindle side position measuring unit and a reading of the tool side position measuring unit.

According to the above described construction, the spindle axial position in the spindle radial direction relative to the first reference position can be measured by the spindle side position measuring unit and the position of the tool post relative to the second reference position can be measured by the tool side position measuring unit. The first reference position and the second reference position are fixed in position relative to each other and no change occurs in the positional relationship. Accordingly, based on the value read out by the spindle side position measuring unit and the value read out by the tool side position measuring unit, the distance between the spindle axis and the cutter edge, which is a distance between the spindle axis and the tool post in the spindle radial direction, can be calculated.

Since as described above, both of the spindle side axial position and the position of the tool post are measurable, the distance between the spindle axis and the cutter edge can be accurately measured. In other words, each of the spindle axial position and the position of the tool post tends to change with the thermal displacement of the machine bed and/or mechanical portions on the machine bed. Since the thermal displacement occurring in both of those positions is measured, the relative distance between the spindle axis and the cutter edge can be measured accurately.

Also, since the spindle side position measuring unit is preferably configured such that either the base end portion of the first scale or the first readout unit is disposed in an area of the spindle axis in the headstock or the member that is movable together with the headstock in the spindle radial direction, unlike the case in which the first scale or the first readout unit is provided at a position offset from the spindle axis, the measurement can be accomplished without being adversely affected by influences such as, for example, the thermal displacement of the machine within a range of such an offset or a deviation. For this reason, an even more accurate measurement can be accomplished with the above-described preferred embodiment of the present invention.

As described above, the distance between the axis of the spindle and the cutter edge of the tool in the spindle radial direction can be measured accurately, so that any necessary corrective action can be taken in response to a change in dimension of the machine, thereby ensuring machine precision and achieving increased processing accuracy.

The calculating block need not necessarily limited to that which calculates the relative distance between the spindle axis and the cutter edge, but may calculate the value to be used in correcting the amount of movement of the headstock and the tool post in the spindle radial direction. Since even in such a case, both of the spindle axis position and the position of the tool post can be calculated, highly accurate correction can be accomplished and as a result, the processing accuracy can be increased.

It is noted that the statement "the first reference position and the second reference position are fixed in position relative to the spindle radial direction" above and hereinafter is intended to mean that relative positional relationship between the first reference position and the second reference position does not change and both are fixed, and the first reference position and the second reference position may be movable together with each other in the spindle radial direction. However, the first reference position and the second reference position change with the thermal displacement of the machine. For this reason, the first reference position and the second reference position may not necessarily coincide with each other in the spindle radial direction, but they are preferably positioned at respective locations sufficiently adjacent to each other to such an extent that the influences of the thermal displacement can be negligible, or positioned at respective locations that are sufficiently close to each other to such an extent that the influences of the thermal displacement can be precisely corrected.

A machine tool according to the present invention may be a machine tool according to first to fifth preferred embodiments, discussed hereinafter, depending on which one of the headstock and the tool post is moved in certain directions. Any of the machine tools according to the first to fifth preferred embodiments makes use of the basic structure of the present invention hereinabove described.

The machine tool according to the first preferred embodiment of the present invention is such that in the basic structure described above, the headstock is mounted on a tailstock, which is provided on the machine bed to move in the spindle radial direction, to move in a spindle axial direction and the tool post is fixed to the machine bed; one of the base end portion of the first scale or the first readout unit is provided on the tailstock at an area of the spindle axis in the spindle radial direction, and the other of the base end portion of the first scale and the first readout unit is provided on the machine bed at the first reference position; and one of the base end portion of the second scale and the second readout unit is fitted to the tool post, and the other of the base end portion of the second scale and the second readout unit is provided at the second reference position that is fixed in position to the machine bed.

In the first preferred embodiment, although the value read out by the first readout unit from the calibrations of the first scale included in the spindle side position measuring unit changes in dependence on the position to which the tailstock has moved and also changes in dependence on the thermal displacement of, for example, the machine bed, the value so read is the current actual distance between the first reference position and the spindle axis. The measured value of the tool side position measuring unit, although it originally represents a constant value, will represent the value added with the thermal displacement of the machine if the latter is made available, and indicates the position of the tool post relative to the second reference position, which in turn represents the current actual value of the cutter edge position of the tool fitted to the tool post. The first reference position and the second reference position are fixed in position relative to each other. For this reason, by calculating the relative distance between the spindle axis and the cutter edge from the read out value of the spindle side position measuring unit and the read out value of the tool side position measuring unit through the calculating block, the actual relative distance between the spindle axis and the cutter edge containing the thermal displacement can be accurately determined.

The machine tool according to the second preferred embodiment of the present invention is such that in the basic structure referred to above, the headstock is provided on the machine bed and fixed in position thereto, the tool post is disposed on the machine bed through a radial direction tailstock and an axial direction tailstock, the radial direction tailstock is provided on the machine bed to move in the spindle radial direction, the axial direction tailstock is mounted on the radial direction tailstock to move in a spindle axial direction, and the tool post is mounted on the axial direction tailstock; one of the base end portion of the first scale and the first readout unit is provided on the headstock at an area of the spindle axis in the spindle radial direction, and the other of the base end portion of the first scale and the first readout unit is provided at the first reference position which will become a position on the radial direction tailstock; and one of the base end portion of the second scale and the second readout unit is fitted to the tool post, and the other of the base end portion of the second scale and the second readout unit is provided at the second reference position which will become a position on the axial direction tailstock.

In the case of the second preferred embodiment described above, the first reference position defines the position on the radial direction tailstock and the second reference position defines the position on the axial direction tailstock. In such a case, since the axial direction tailstock is located on the radial direction tailstock that moves in the axial direction, the first reference position and the second reference positions are movable with the radial direction tailstock together relative to each other and, hence, the relative positions of the first reference position and the second reference position are fixed. Although by the movement of the radial direction tailstock, the tool post moves relative to the spindle axis, the actual position of the radial direction tailstock is measured by the spindle side position measuring unit and the mechanical thermal displacement, for example, of the tool post relative to the radial direction tailstock is discerned from the measurement of the tool side position measuring unit. For this reason, even in this construction, by calculating the relative distance between the spindle axis and the cutter edge from the read out value of the spindle side position measuring unit and the read out value of the tool side position measuring unit through the calculating block, the actual relative distance between the spindle axis and the cutter edge containing the thermal displacement can be determined accurately.

The machine tool according to the third preferred embodiment of the present invention is such that in the basic structure referred to above, the headstock is provided on the machine bed to move in the spindle radial direction and the tool post is mounted on an axial direction tailstock provided on the machine bed to move in the spindle axial direction; one of the base end portion of the first scale and the first readout unit is provided on the headstock at an area of the spindle axis in the spindle radial direction, and the other of the base end portion of the first scale and the first readout unit is provided at the first reference position fixed in position thereto; and one of the base end portion of the second scale and the second readout unit is fitted to the tool post, and the other of the base end portion of the second scale and the second readout unit is provided at the second reference position which will become a position on the axial direction tailstock.

In the case of the third preferred embodiment described above, the headstock moves in the spindle radial direction and the tool post moves in the spindle axial direction. In such a case, by the spindle side position measuring unit, the actual position of the spindle axis relative to the first reference position is measured and, by the tool side position measuring unit, the actual position of the tool post relative to the second reference position is measured. For this reason, even in the third preferred embodiment, by calculating the relative distance between the spindle axis and the cutter edge from the read out value of the spindle side position measuring unit and the read out value of the tool side position measuring unit through the calculating block, the actual relative distance between the spindle axis and the cutter edge containing the thermal displacement can be determined accurately.

The machine tool according to the fourth preferred embodiment of the present invention is such that in the basic structure referred to above, the headstock is provided on the machine bed to move in the spindle axial direction and the tool post is mounted on a radial direction tailstock that is disposed on the machine bed to move in the spindle radial direction; one of the base end portion of the first scale and the first readout unit is provided on the headstock at an area of the spindle axis in the spindle radial direction, and the other of the base end portion of the first scale and the first readout unit is provided at the first reference position which will become a position on the radial direction tailstock; and one of the base end portion of the second scale and the second readout unit is fitted to the tool post, and the other of the base end portion of the second scale and the second readout unit is provided at the second reference position which will become a position on the radial direction tailstock.

In the case of the fourth preferred embodiment described above, the first reference position and the second reference position become respective positions on the radial direction tailstock. While the radial tailstock moves in the spindle radial direction, the actual position of the spindle axis relative to the first reference position on the radial direction tailstock is measured by the spindle side position measuring unit and the thermal displacement, for example, of the cutter block relative to the radial direction tailstock is determined by the measurement of the tool side position measuring unit. For this reason, even in this construction now under discussion, by calculating the relative distance between the spindle axis and the cutter edge from the read out value of the spindle side position measuring unit and the read out value of the tool side position measuring unit through the calculating block, the actual relative distance between the spindle axis and the cutter edge containing the thermal displacement can be determined accurately.

Where the headstock can move directly or indirectly in the spindle radial direction such as in the machine tool designed according to the above described first preferred embodiment of the present invention or the machine tool designed according to the above described third preferred embodiment of the present invention, the first scale of the spindle side position measuring unit preferably includes first calibrations provided within a region extending from a position that the first readout unit corresponds to when the headstock is positioned at a position where a cutter edge of the tool on the tool post contacts an outer diameter of the work held by the chuck and having the largest possible diameter that can be processed, to a position of origin that the first readout unit corresponds to when an axis of the spindle assumes the same spindle radial direction position as the cutter edge of the tool.

If as hereinabove described only the minimum required range of the first scale of the spindle side position measuring unit is provided with the first calibrations, the required position measurement can be accomplished in dependence on the movement of the headstock. By minimizing the range of the first calibrations in the manner described above, reduction in cost can be achieved.

Also, where the tool post can move directly or indirectly in the spindle radial direction such as in the machine tool designed according to the above described second preferred embodiment of the present invention or the machine tool designed according to the above described fourth preferred embodiment of the present invention, the first scale of the spindle side position measuring unit preferably includes first calibrations within a region extending from a position that the first readout unit corresponds to when the tailstock is positioned at a position where a cutter edge of the tool on the tool post contacts an outer diameter of a work held by the chuck and having the largest possible diameter that can be processed, to a position of origin that the first readout unit corresponds to when an axis of the spindle assumes the same spindle radial direction position as the cutter edge of the tool.

If as hereinabove described only the minimum required range of the first scale of the spindle side position measuring unit is provided with the first calibrations, the required position measurement can be accomplished in dependence on the movement of the headstock. By minimizing the range of the first calibrations in the manner described above, reduction in cost can be expected.

A machine tool according to various preferred embodiments of the present invention may include a control device arranged and programmed to move the tool post relative to the headstock in accordance with a command value of a moving command, and the control device preferably includes a thermal displacement corrector to perform a correction in response to the command value in dependence on a relative distance between the spindle axial position and the cutter edge that is determined by the calculating block.

The processing accuracy of the work diameter is determined depending on the accuracy of the cutter edge position of the tool relative to the spindle axis. If as hereinabove described, the relative distance between the spindle axial position and the cutter edge position can be measured accurately, an accurate processing can be performed to the thermal displacement by performing the correction using the relative distance between the spindle axis and the cutter edge position determined by the calculating block, in response to the command value to move the headstock relative to the tool post or the tool post relative to the headstock.

In general, any change in temperature of the machine tool during one day is not fixed. According to various preferred embodiments of present invention, however, the relative distance between the spindle axis position and the cutter edge position can be accurately detected in a condition of the thermal displacement taking place at the time of measurement. Accordingly, by performing the measurement at intervals of an appropriate time and performing the correction through the thermal displacement corrector at a time after the measurement, an accurate processing can be accomplished.

The machine tool according to the fifth preferred embodiment of the present invention is such that in the machine tool of the type including a headstock, which rotatably supports a spindle including a tip provided with a chuck for holding a work, and a tool post having a tool fitted thereto, the headstock and the tool post being disposed on a machine bed to move relative to each other in a spindle radial direction and a spindle axial direction, and the machine tool includes a spindle side position measuring unit including a first scale extending in the spindle radial direction, and a first readout unit arranged to read the first scale and to measure a spindle axial position in the spindle radial direction relative to a first reference position, one of a base end portion of the first scale and the first readout unit being provided on a portion of the headstock or a member that is movable in the spindle radial direction together with the headstock at an area of the spindle axis in the spindle radial direction, and the other of the base end of the first scale and the first readout unit being provided at the first reference position; a tool side position measuring unit arranged to measure the position of the tool post relative to a second reference position in the spindle radial direction; the first reference position and the second reference position being fixed in position relative to the spindle radial direction; and a calculating block arranged to calculate a relative distance between a spindle axis and a cutter edge that corresponds to a distance between the spindle axis and the cutter edge in the spindle radial direction or to calculate a value used in correcting an amount of relative movement between the headstock and the tool post in the spindle radial direction based on a reading of the spindle side position measuring unit and a reading of the tool side position measuring unit.

The machine tool designed in accordance with the above described fifth preferred embodiment is a machine tool designed in accordance with the present invention, in which in the machine tool of the previously described basic structure, the tool side position measuring unit is not limited to the one having the second scale, but makes use of the "tool side position measuring unit arranged to measure the position of the tool post relative to a second reference position in the spindle radial direction". For the tool side position measuring unit, other than the structure utilizing the second scale, any structure capable of measuring the position of the tool post by measuring the temperature, for example, the structure including a temperature measuring unit, which is arranged to measure the temperature of the tool post, and a temperature responsive tool side position calculator arranged to calculate the position of the tool post relative to the second reference position in the spindle radial direction from the measured temperature value of the temperature measuring unit can be used.

Even in the fifth preferred embodiment described above, since the spindle axial position in the spindle radial direction relative to the first reference position is measured by the spindle side position measuring unit and the position of the tool post relative to the second reference position is measured by the tool side position measuring unit, thereby accomplishing the measurement of both of the spindle axial position and the position of the tool post, the relative distance between the spindle axis and the cutter edge can be accurately measured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
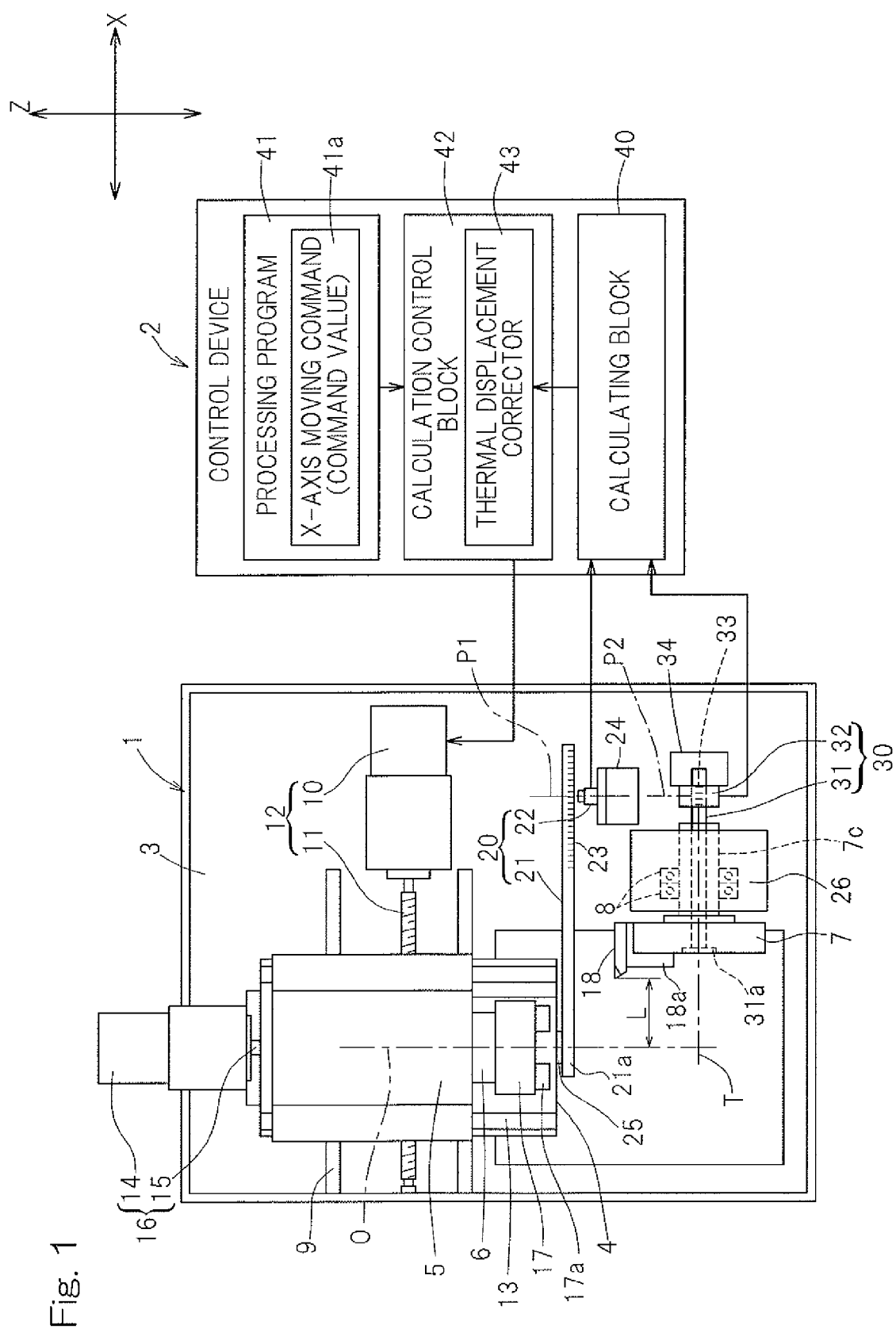
FIG. 1 is an explanatory diagram illustrating a top plan view of a machine tool main body in a machine tool, according to a first preferred embodiment of the present invention, shown together with a block diagram of a conceptual structure of a control device.

With particular reference to FIGS. 1 to 6, a first preferred embodiment of the present invention will be described in detail. The machine tool shown therein preferably is a numerical control machine tool and includes a machine tool main body 1 defining a mechanical portion, and a control device 2 to control the machine tool main body 1. The machine tool main body 1 preferably is a turning machine of a spindle moving type, which is designed and configured such that a headstock 5 is mounted on a machine bed 3 through a tailstock 4, a spindle 6 is rotatably supported by the headstock 5 and a tool post 7 is mounted on the machine bed 3 through a support block 26. The support block 26 is mounted on and fixed to the machine bed 3. The tool post 7 preferably includes a turret and is supported rotatably by the support block 5 to perform indexing motion.

The tailstock 4 is arranged on an X-axis guide 9, provided on the machine bed 3, to move in a horizontal spindle radial direction (X-axis direction) perpendicular to an axis O of the spindle 6 and is driven by an X-axis moving mechanism 12 preferably including a motor 10 such as, for example, a servomotor mounted on the machine bed 3 and a feed screw mechanism 11 to translate a rotary output of the motor 10 into a linear motion, so as to be selectively advanced or retracted in a horizontal direction, or a left and right direction in FIG. 1. As shown in FIG. 4, the headstock 5 is arranged on a Z-axis guide 13, provided on the tailstock 4, to move in a spindle axial direction (Z-axis direction) and is driven by a Z-axis moving mechanism 16 including a motor 14 (best shown in FIGS. 1 and 2), mounted on the tailstock 4, and a feed screw mechanism 15 to translate a rotary output of the motor 14 into a linear motion so as to be selectively advanced or retracted in the spindle axial direction, or in the Z-axis direction. The feed screw mechanism 15 referred to above preferably includes a screw shaft and a nut. A rotational drive of the spindle 6 is produced by a spindle motor (not shown) built in the headstock 5. The spindle 6 includes a front end provided removably with a chuck 17. The chuck 17 is capable of holding a work W (best shown in FIG. 3) via a plurality of chuck pawls 17a that are movable in a radial direction of the chuck.

Figure 5:
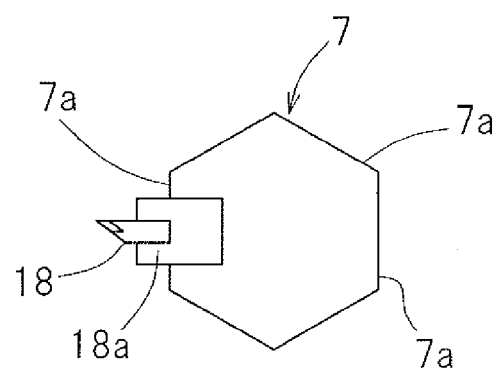
FIG. 5 is a partially omitted side view illustrating a tool post and a tool used in the machine tool.

The tool post 7 is rotatable relative to the support block 26 about a horizontal rotational center T extending along the X-axis direction and its outer peripheral portion is provided with a plurality of circumferentially juxtaposed tool fitting areas 7a as shown in FIG. 5. To each of the tool fitting areas 7a, a tool 18 such as, for example, a bite or a rotary tool is fitted through a tool holder 18a. As best shown in FIG. 1, the tool post 7 is fixed to a tip of a hollow shaft 7c that is rotatably supported by the support block 26 through bearings 8. When the hollow shaft 7c is rotated by an indexing motor (not shown), an arbitrary one of the tool fitting areas 7a is turned to a position opposite to the spindle 6. A shape of the tool post 7 as seen from a front elevation view preferably is either a polygonal shape as shown in FIG. 5 or a round shape. It is to be noted that in FIG. 5, the tool 18 is shown as fitted to one of the tool fitting areas 7a and other tools 18 fitted to the remaining tool fitting areas 7a are not shown for the sake of clarity.

Figure 2:
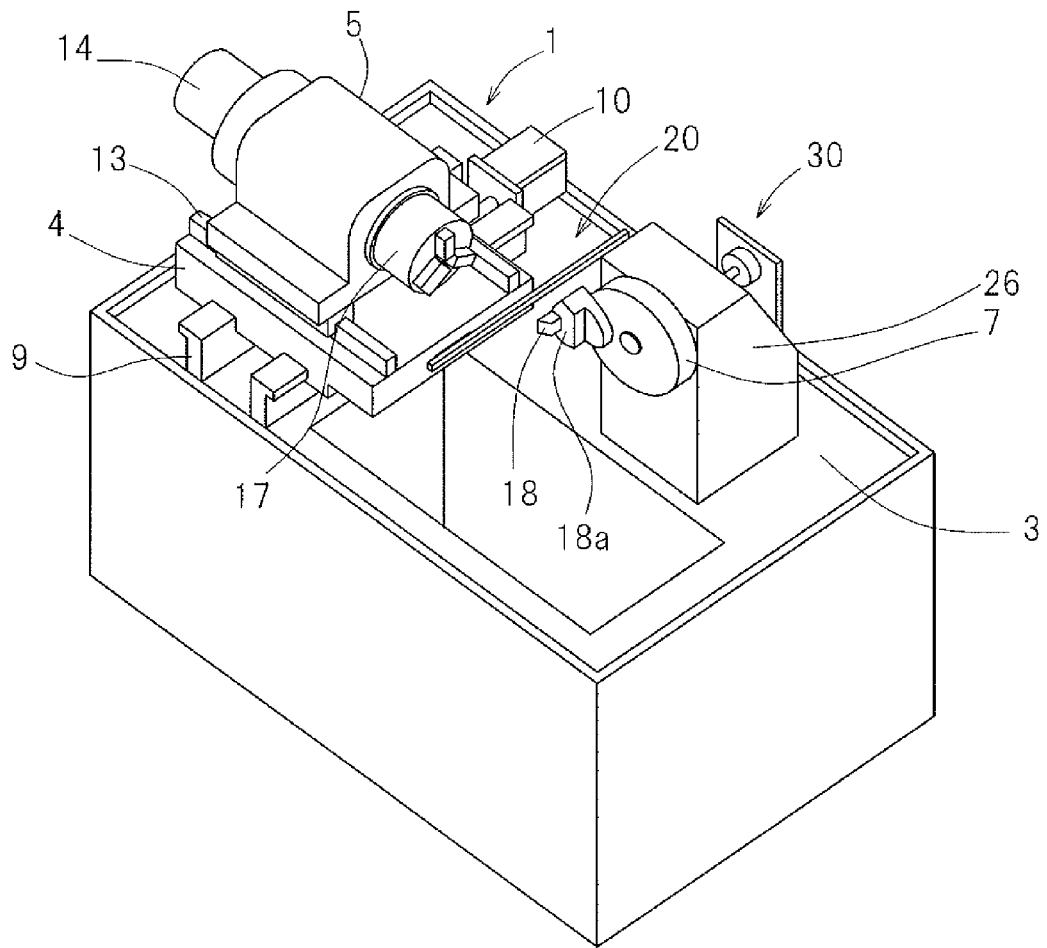
FIG. 2 is a perspective view of the machine tool main body.

Referring to FIGS. 1 and 2, the machine tool according to the first preferred embodiment preferably is of a type in which a spindle side position measuring unit 20 and a tool side position measuring unit 30 are provided in the machine tool main body 1 having the basic construction described above.

The spindle side position measuring block 20 is arranged to measure the position of the spindle axis O in the spindle radial direction (X-axis direction) relative to a first reference position P1 and preferably includes a first scale 21 and a first readout unit 22. The first scale 21 preferably is a rod-shaped member and includes a base end portion 21a fitted to a site of the tailstock 4 in an area of the axis O of the spindle 6. The first scale 21 extends from this base end portion 21a along the spindle radial direction. It is to be noted that the phrase "in an area of the axis" referred to above is intended to encompass the axial position and, as compared with the base end portion 21a of the first scale 21 fitted at the axial position, the range of separation to an extent such that the difference in results of measurement brought about by a thermal displacement can be negligible is referred to as "in an area of the axis". The phrase "in an area of the axis" hereinafter used is also to be construed the same as described above. Although the first scale 21 has been shown as preferably fitted to a front surface of the tailstock 4 through a spacer member 25, the first scale 21 may be fitted to any other location such as, for example, an upper or lower surface of the tailstock 4 or in an area of a front end of the lower surface thereof.

First calibrations 23 are provided on the first scale 21 along the spindle radial direction within a predetermined region of a surface of such first scale 21 opposite to the first readout unit 22. The first readout unit 22 is arranged to readout any one of the first calibrations 23 of the first scale 21 and is fixed in position at the first reference position P1, which defines a position on the machine bed 3, through a mounting member 24. By way of example, the first readout unit 22 preferably is an optical type and reads the first calibrations 23 one at a time by projecting a detection light and then receiving a reflected light thereof. Alternatively, the first readout unit 22 may be of a magnetic type, for example.

The range of the first scale 21, on which the first calibrations 23 are provided, preferably is a range extending from the following outer most position to the following origin position, or a range of length within which the maximum thermal displacement can be measured at one point or a plurality of points thereof. The outer most position is a position where the first readout unit 22 occupies when the headstock 5 is positioned at a position where a cutter edge of the tool 18 in the tool post 7 contacts an outer diameter of the work W (best shown in FIG. 3) of a maximum diameter that can be processed while it has been held by the chuck 17. The origin position is a position that the first readout unit 22 occupies when the axis O of the spindle 6 assumes the same spindle radial direction position as that of the cutter edge of the tool 18. Where the headstock 5 is movable in the spindle radial direction such as in the present preferred embodiment, if the first calibrations 23 of the first scale 21 are provided within the absolutely essential minimum range, a required positional measurement in dependence on the movement of the headstock 5 can be accomplished. If the range of the first scale 21 where the first calibrations 23 are provided is chosen to be a minimum required range, the cost can be reduced.

Also, if with respect to the range corresponding to the movement of the headstock 5 during the processing, the first calibrations 23 are made fine, but with respect to the range over which the headstock 5 moves at any time other than the processing, for example, during the work replacement and/or the chuck replacement, the first calibrations 23 are made rough, the cost can be further reduced. In any event, however, the first calibrations 23 may be provided over the entire length of the first scale 21.

The tool side position measuring unit 30 is arranged to detect the position of the tool post 7 in the spindle radial direction (X-axis direction) relative to a second reference position P2 and preferably includes a second scale 31 and a second readout unit 32. The second scale 31 preferably is a rod-shaped member and includes a base end portion 31*a* fitted to the tool post 7 so as to conform a center thereof to a center of rotation of the tool post 7 and extends through the hollow shaft 7*c* along the spindle radial direction, that is, the center T of rotation. The base end portion 31*a* of the second scale 31 is fixed to the tool post 7, but a portion other than the base end portion 31*a* is capable of rotating and selectively advancing or retracting relative to the hollow shaft 7*c*. On the tip end portion of the second scale 31, which protrudes outwardly from the hollow shaft 7*c*, second calibrations 33 juxtaposed in the spindle radial direction are arranged over the entire periphery in cooperation with the second readout unit 32. The second readout unit 32 preferably has an annular configuration to read any one of the second calibrations 33 of the second scale 31 and is fixed in position at the second reference position P2, which is a position on the machine bed 3, through a mounting member 34. It is to be noted that the second readout unit 32 as well may be of either an optical type or a magnetic type.

The first readout unit 22 of the spindle side position measuring unit 20 and the second readout unit 32 of the tool side position measuring unit 30 are positioned so as to allow the respective spindle radial direction positions of the first and second readout units 22 and 32 to be completely aligned with each other or, alternatively, to align with each other to such an extent that the thermal displacement in the spindle radial direction, which is brought about by the difference between the respective spindle radial direction positions of the first and second readout units 22 and 32, can be negligible or estimated. In other words, respective spindle radial direction positions of the first reference position P1 and the second reference position P2 are aligned with each other.

Respective readings of the first readout unit 22 of the spindle side position measuring unit 20 and the second readout unit 32 of the tool side position measuring unit 30 are inputted to a calculating block 40 of the control device 2. In the present preferred embodiment, the calculating block 40 is preferably provided within the control device 2, but it may be provided separate from the control device 2.

The calculating block 40 is arranged to calculate, from the respective readings of the first readout unit 22 of the spindle side position measuring unit 20 and the second readout unit 32 of the tool side position measuring unit 30, a relative distance L between the spindle axis and the cutter edge, which is a distance between the spindle axis O and a particular position of the tool post 7 in the spindle radial direction (X-axis direction). The particular position of the tool post 7 referred to above may be any position provided that it is a position on the tool post 7 and a position on the tool 18 fitted to the tool post 7, and, in the instance now under discussion, the particular position is represented by a cutter edge position of the standard tool 18 fitted to the tool post 7. The standard tool 18 referred to above may be any arbitrarily chosen tool and, for example, it is rendered to be the tool 18 that is popularly used in this kind of the machine tool.

Figure 6:
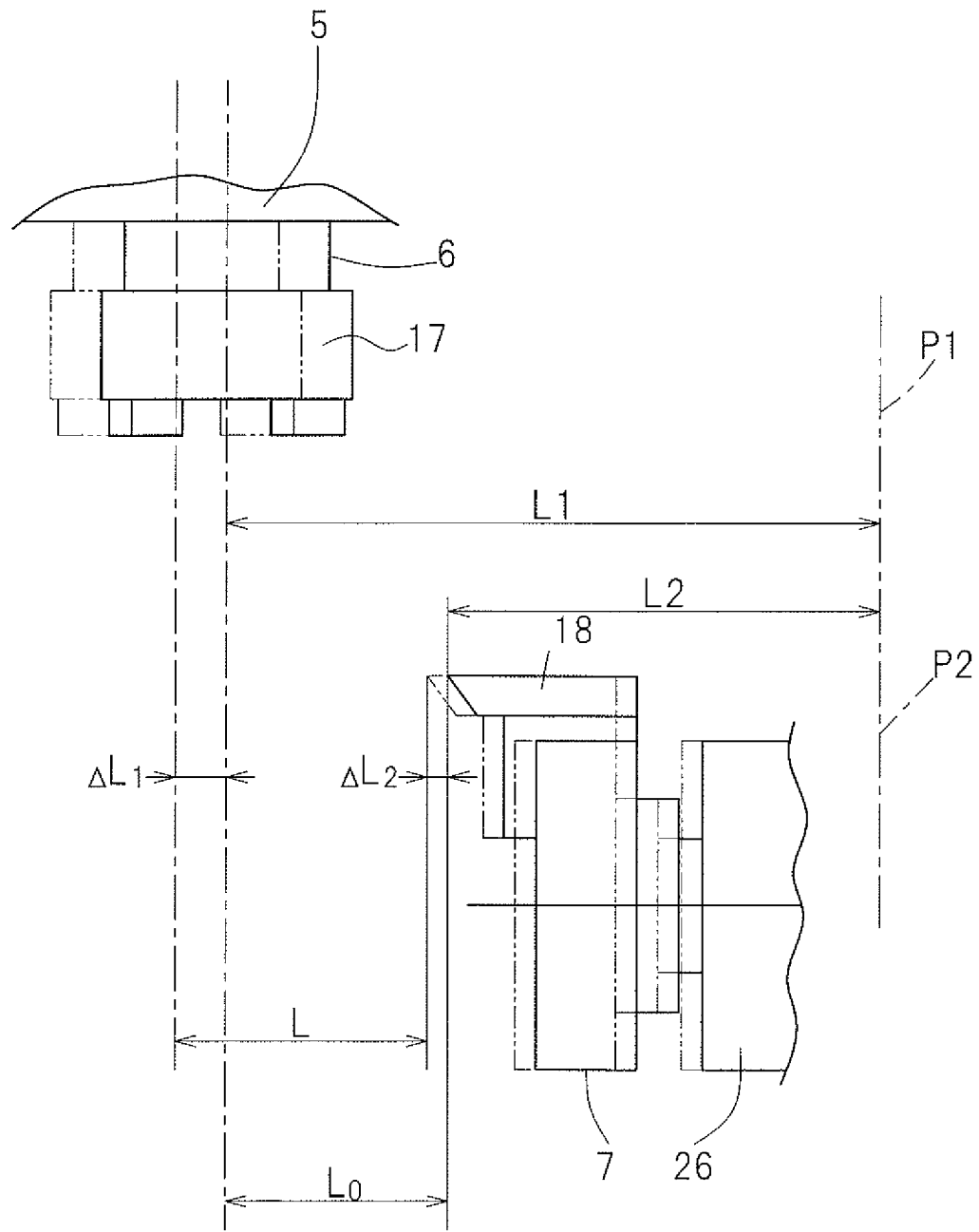
FIG. 6 is an explanatory diagram illustrating a relative distance between a spindle axial position and a cutter edge position at normal temperatures and the relative distance between the spindle axial position and the cutter edge position during the processing.

FIG. 6 illustrates respective positions (shown by the solid lines) of the headstock 5 and the tool post 7 at normal temperatures and respective positions (shown by the double dotted lines) of the headstock 5 and the tool post 7 at the heating-up time. The relative distance L0 between the spindle axis and the cutter edge at the normal temperature (for example, 15° C.) is determined from the known dimensions of the machine tool and the tool 18. The calculating block 40 calculates the relative distance L between the spindle axis and the cutter edge by determining based on the reading of the first readout unit 22 of the spindle side position measuring unit 20 and the reading of the second readout unit 32 of the tool side position measuring unit 30, the amount $\Delta L1$ of the thermal displacement of the headstock 5 in the spindle radial direction and the amount $\Delta L2$ of the thermal displacement of the tool post 7 at the heating-up time and then adding the thermal displacement amounts $\Delta L1$ and $\Delta L2$ to the relative distance L0 between the spindle axis and the cutter edge at the normal temperature.

That will now be discussed in more detail.

In the spindle side position measuring unit 20, the first readout unit 22 reads one of the first calibrations 23 of the first scale 21. Since the first readout unit 22 is fixed in position to the machine bed 3, the spindle radial direction position of the tailstock 4 including the first scale 21 is determined based on the reading of the first readout unit 22. The spindle radial direction position of the headstock 5 is determined by adding a positional relationship between the tailstock 4 and the headstock 5 to the position of the tailstock 4. In other words, the distance L1 between the first reference position P1 and the spindle axis O is determined. While the tailstock 4 moved in the spindle radial direction during the processing, the spindle radial direction position of the headstock 5 can be determined at all times by detecting the amount of movement of the tailstock 4 by a separate detecting device (not shown) and then adding the detected amount of movement. From the spindle radial direction position of the headstock 5, the amount $\Delta L1$ of the thermal displacement in the spindle radial direction during the processing relative to the normal temperature is determined.

Also, in the tool side position measuring unit 30, the second readout unit 32 reads one of the second calibrations 33 of the second scale 31. Since the second readout unit 32 is fixed in position to the machine bed 3, the spindle radial direction position of the tool post 7 having the second scale 31 fitted thereto is determined from the reading of the second readout unit 32. In other words, the distance L2 between the second reference position P2 and the particular position of the tool post 7 (for example, the cutter edge position of the tool 18) is determined. Based on the spindle radial direction position of the tool post 7, the amount $\Delta L2$ of the thermal displacement in the spindle radial direction during the processing relative to the normal temperature is determined. Although the thermal displacement amount of the tool post 7 is regarded as the thermal displacement amount of the cutter edge position of the tool 18 fitted to the tool post 7, the thermal displacement amount of a tool cutter edge position may be determined by adding an appropriate correction to the thermal displacement amount of the tool post 7.

As hereinbefore described, the calculating block 40 calculates the relative distance L between the spindle axis and the cutter edge at the heating-up time, or during the operation, by adding the thermal displacement amounts $\Delta L1$ and $\Delta L2$ to the relative distance L0 between the spindle axis and the cutter edge at the normal temperature. This distance L between the spindle axis and the cutter edge is the one to which a dimensional change resulting from the thermal displacement has been added to the relative distance L0 between the spindle axis and the cutter edge at the normal temperature and is indicative of the accurate distance at the current time. A result of calculation of the calculating block 40 is stored in the calculating block 40 or a thermal displacement corrector 43 best shown in FIG. 1. In place of the determination of the relative distance L between the spindle axis and the cutter edge, however, a change in relative distance L between the spindle axis and the cutter edge may be determined.

Referring again to FIG. 1, the control device 2 preferably includes a computerized numerical control device and provides a control command to various drive sources of the machine tool main body 1 by decoding and executing various commands of a processing program 41 via a calculation control block 42. A movement command 41a of the processing program 41 in the X-axis direction is a command necessary to relatively move the tool post 7 in the X-axis direction to a position of a command value indicative of the destination and is outputted from the calculation control block 42 as a command to drive the motor 10 of the X-axis.

The calculation control block 42 preferably includes the thermal displacement corrector 43 and corrects the command value to be outputted to the motor 10, using the relative distance L between the spindle axis and the cutter edge, which has been calculated by the calculating block 40, relative to the command value of the movement command 41a in the X-axis direction of the processing program 41. The thermal displacement corrector 43 operates such that when, for example, the relative distance L between the spindle axis and the cutter edge is inputted from the calculating block 40, it is always stored up until the value thereof is updated and the correction is performed using the value so stored. In such a case, the spindle side position measuring unit 20 and the tool side position measuring unit 30 perform respective position measurements and, when the value of the relative distance L between the spindle axis and the cutter edge, which is calculated by the calculating block 40, is updated, the amount of correction of the thermal displacement corrector 43, which takes place subsequently, changes. The amount of correction by the thermal displacement corrector 43 will be discussed in detail later.

The thermal displacement corrector 43 is capable of switching between an active state and an inactive state in response to a predetermined input via, for example, a switch manipulation. Also, the respective measuring operations of the spindle side position measuring unit 20 and the tool side position measuring unit 30 may be carried out manually via an input operation of an operating panel (not shown) affixed to the control device 2 or, alternatively, a series of measuring operations may be carried out automatically by causing the control device 2 to execute a measurement program (not shown) provided in the control device 2. Where the measurement is carried out automatically, the measurement may take place at a preset time through, for example, a timer (not shown), or, alternatively, a series of automatic measurements may be initiated when an operator switches a starting switch on.

Figure 3:
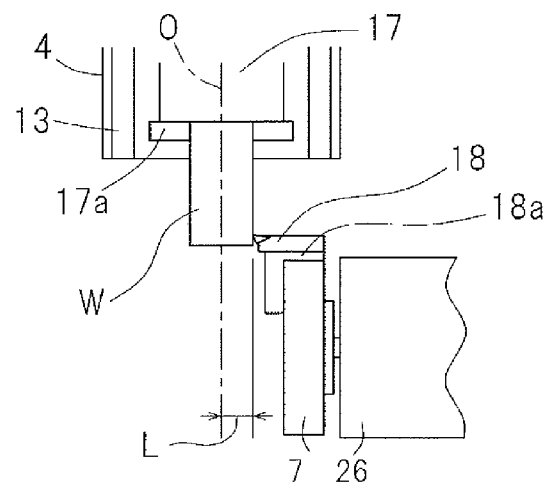
FIG. 3 is a fragmentary top plan view illustrating the machine tool in a processing operation.
Figure 4:
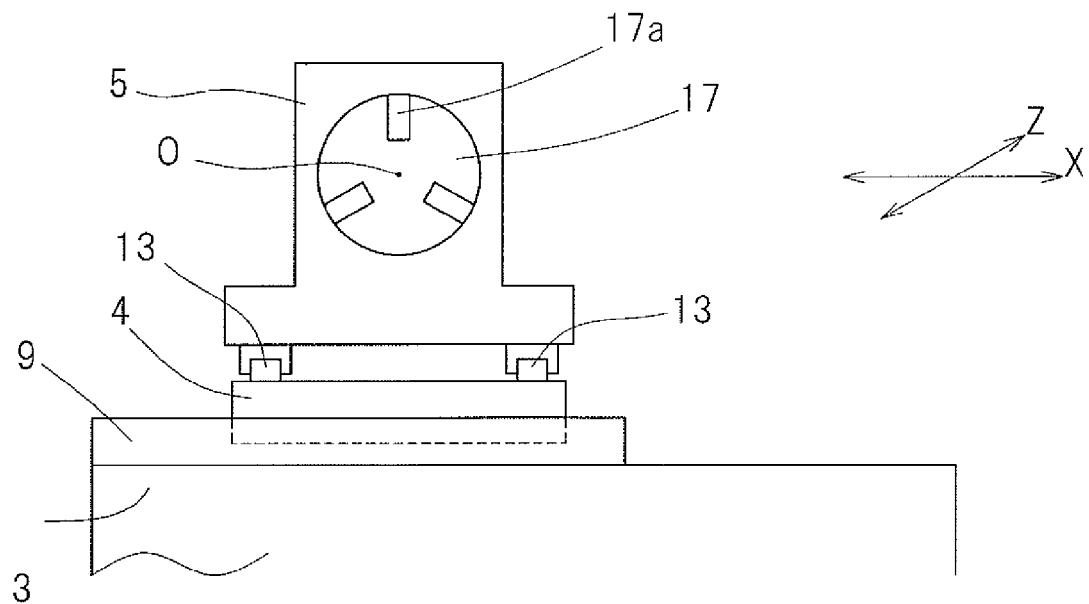
FIG. 4 is a front elevational view of a headstock portion of the machine tool.

The thermal displacement corrector 43 corrects a command value of the X-axis movement command 41a, when the processing is to be carried out in a manner as shown in FIG. 3, by causing the calculation control block 42 to execute the X-axis movement command 41a of the processing program 41 in dependence on the relative distance L between the spindle axis and the cutter edge stored in the calculating block 40 or the thermal displacement corrector 43. This correction adds the difference between the relative distance L between the spindle axis and the cutter edge and the design dimension to the command value. The thermal displacement corrector 43 may have a relationship setting unit such as, for example, arithmetic equations or tables that determine the amount of correction to a result of calculation performed by, for example, the calculating block 40, so that the command value referred to above can be corrected by the amount of correction determined by the relationship setting unit. The relationship that is determined by the above described relationship setting unit may be, for example, relations of the amount of correction to the difference between the distance, determined by the calculating block 40, and the command value, which relationships are based on results of actual operations. With the correction performed by the thermal displacement corrector 43 in the manner described above, an accurate correction relative to the thermal displacement can be accomplished and the processing accuracy can therefore increases.

The proper thermal displacement correction can be accomplished if the measurement is carried out at a preset time of the day, for example, every one hour, or a predetermined time and the result of calculation performed by the calculating block 40 is updated.

Figure 7:
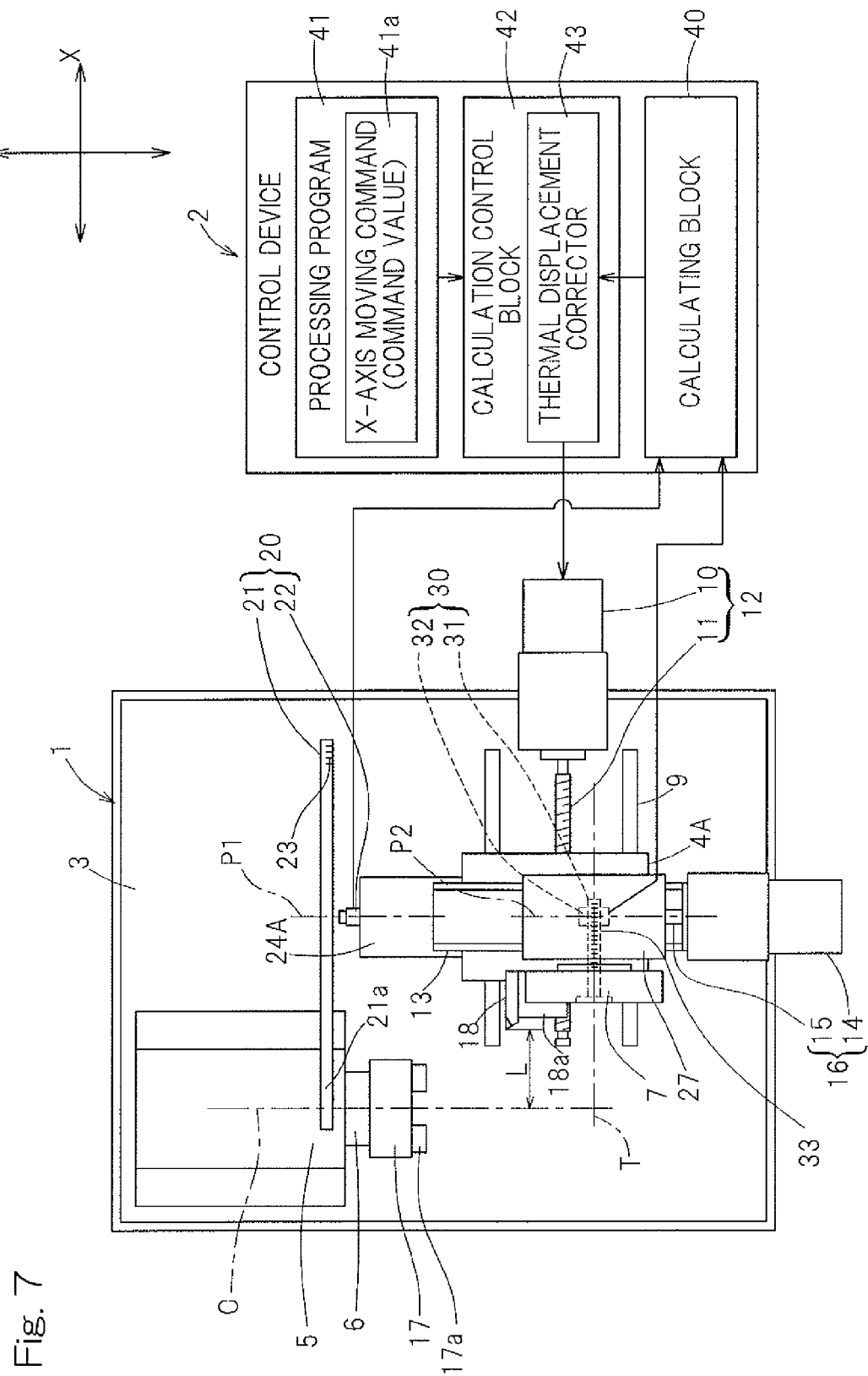
FIG. 7 is an explanatory diagram illustrating a top plan view of the machine tool main body in the machine tool, in accordance with a second preferred embodiment of the present invention, shown together with a block diagram of the conceptual structure of the control device.

FIG. 7 illustrates a second preferred embodiment of the present invention. The machine tool main body 1 of the machine tool according to the second preferred embodiment preferably is a turning machine of a tool post moving type, in which the headstock 5 is fixed in position on the machine bed 3 and the tool post 7 is provided on the machine bed 3 through a radial direction tailstock 4A and an axial direction tailstock 27 to move in the spindle radial direction (X-axis direction) and the spindle axial direction (Z-axis direction). The radial direction tailstock 4A is disposed to move in the horizontal spindle radial direction on an X-axis guide 9 provided on the machine bed 3 and is driven by an X-axis moving mechanism 12 for selective advance or retraction. The axial direction tailstock 27 is disposed to move in the spindle axial direction on a Z-axis guide 13 provided on the radial direction tailstock 4A and is driven by a Z-axis moving mechanism 16 for selective advance or retraction. The tool post 7 preferably includes a turret and is disposed on the axial direction tailstock 27 for rotation about a horizontal center T of rotation along the X-axis direction. The basic structure of the machine tool main body 1 other than those described above are identical with those shown in and described in connection with the previously described first preferred embodiment and therefore, like components thereof are designated by like reference numerals while the details thereof are not reiterated for the sake of brevity.

Even in the machine tool according to the second preferred embodiment, the machine tool main body 1 is preferably provided with the spindle side position measuring unit 20 and the tool side position measuring unit 30.

The spindle side position measuring unit 20 is arranged to measure the position of the axis O of the spindle in the spindle radial direction (X-axis direction) relative to the first reference position P1 and preferably includes the first scale 21 and the first readout unit 22. The first scale 21 preferably is a rod-shaped member, and includes a base end portion 21a fitted to a site of the headstock 5 at an area of the axis O of the spindle 6. The first scale 21 extends from this base end portion 21a along the spindle radial direction. Although the base end portion 21a of the first scale 21 is fitted to, for example, an upper surface relative to the headstock 5, it may be fitted to a lower surface or a front surface, or within the headstock 5.

First calibrations 23 juxtaposed in the spindle radial direction are provided in a surface of the first scale 21, which opposes the first readout unit 22, at a site corresponding to the first readout unit 22. The first readout unit 22 is arranged to readout any one of the first calibrations 23 of the first scale 21 and is fitted through a mounting member 24A at a particular position of the radial direction tailstock 4A, which becomes the first reference position P1. Accordingly, in the second preferred embodiment, the first reference position P1 is movable and moves together with the radial direction tailstock 4A. The particular position of the radial direction tailstock 4A referred to above preferably is, for example, a center position of the radial direction tailstock 4A with respect to an X-axis direction width.

The tool side position measuring unit 30 is arranged to detect the position of the tool post 7 in the spindle radial direction (X-axis direction) relative to a second reference position P2 and preferably includes a second scale 31 and a second readout unit 32. The second scale 31 preferably is a rod-shaped member and has a base end portion 31a fitted to the tool post 7 and extends from the base end portion 31a in the spindle radial direction. A predetermined region of a surface of the second scale 31, which opposes the second readout unit 32, includes second calibrations 33 juxtaposed in the spindle radial direction. The region where the second calibrations 33 are located is similar to that region where the second calibrations 33 in the previously described first preferred embodiment are located. The second readout unit 32 is arranged to read out the second calibrations 33 on the second scale 31 and is disposed at the second reference position P2. The second reference position P2 in the second preferred embodiment is defined at a particular position on the axial direction tailstock 27 and the second readout unit 32 is fixed either directly or through a mounting member (not shown) to the axial direction tailstock 27. The particular position referred to above is preferably an arbitrarily chosen position on the axial direction tailstock 27, but in the present preferred embodiment it is preferably the same X-direction position as the first reference position P1.

In a manner similar to that described previously, respective read values of the first readout unit 22 and the second readout unit 32 are inputted to the calculating block 40, and the calculating block 40 calculates the relative distance L between the spindle axis and the cutter edge during, for example, the operation by determining the amount ΔL1 (best shown in FIG. 6) of the thermal displacement in the spindle radial direction of the headstock 5 during the processing relative to the normal temperature and the amount ΔL2 (similarly best shown in FIG. 6) of the thermal displacement in the spindle radial direction of the cutter bolder 7 during the processing relative to the normal temperature and then adding those thermal displacement amounts ΔL1 and ΔL2 to the relative distance L0 (best shown in FIG. 6) between the spindle axis and the cutter edge during the normal temperature. Even in this case, the accurate relative distance L between the spindle axis and the cutter edge, in which a change in dimension caused by the thermal displacement is added to the relative distance L0 between the spindle axis and the cutter edge during the normal temperature, can be obtained and, by performing the correction through the thermal displacement corrector 43 with the use of this relative distance L between the spindle axis and the cutter edge, the accurate correction can be effected in dependence on the thermal displacement and the processing accuracy is therefore increased.

Figure 8:
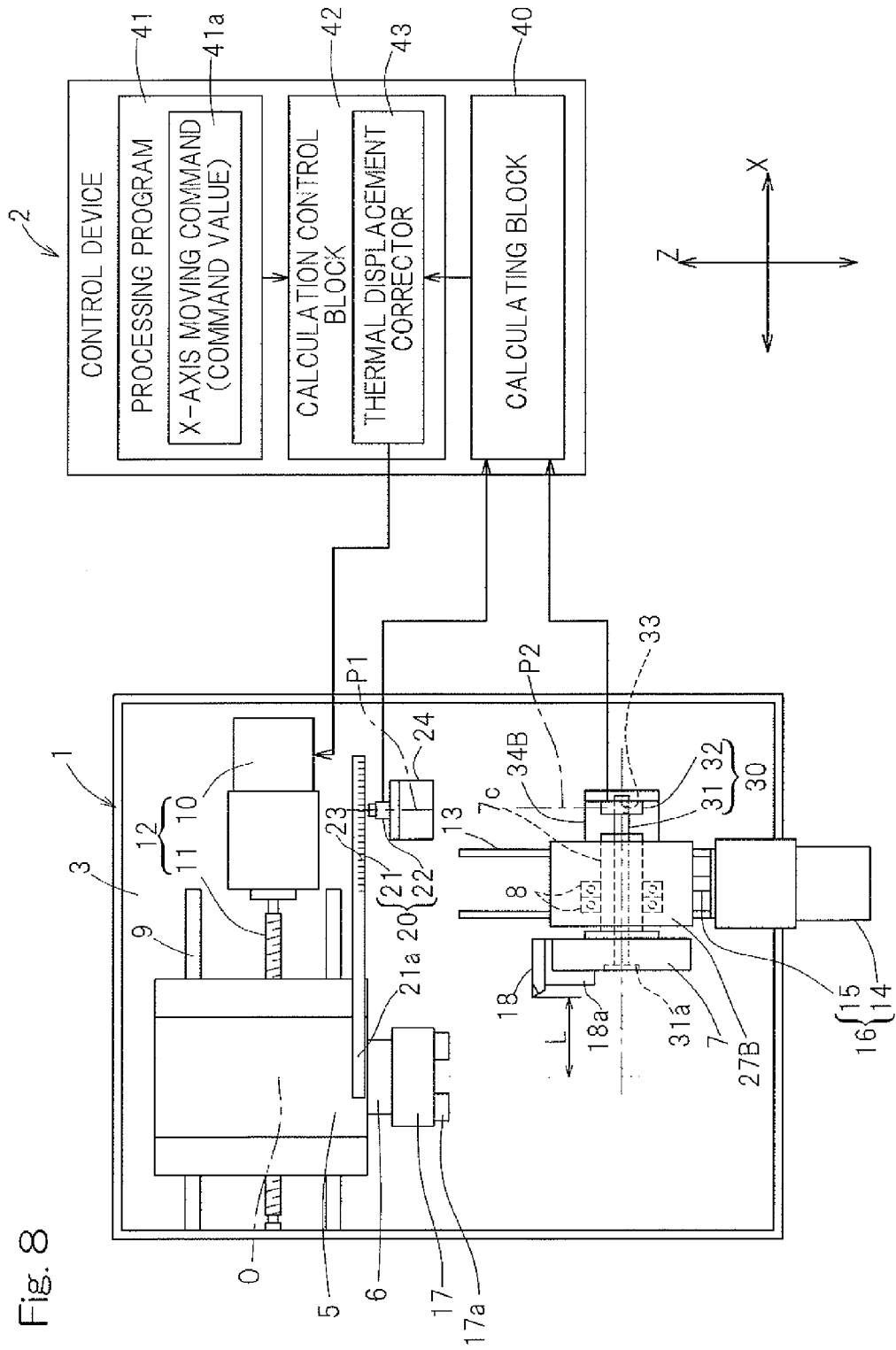
FIG. 8 is an explanatory diagram illustrating a top plan view of the machine tool main body in the machine tool, in accordance with a third preferred embodiment of the present invention, shown together with a block diagram of the conceptual structure of the control device.

FIG. 8 illustrates a third preferred embodiment of the present invention. The machine tool main body 1 of the machine tool designed according to the third preferred embodiment preferably is a turning machine of a type in which the headstock and the tool post are movable. The headstock 5 included in the third preferred embodiment is provided on the machine bed 3 to move in the spindle radial direction (X-axis direction), and the tool post 7 is provided on the machine bed 3 to move in the spindle axial direction (Z-axis direction) through an axial direction tailstock 27B. This headstock 5 is disposed on an X-axis guide 9, provided on the machine bed 3, to move in the horizontal spindle radial direction and is driven by an X-axis moving mechanism 12 for selective advance or retraction. The axial direction tailstock 27B is disposed on a Z-axis guide 13, provided on the machine bed 3, to move in the spindle axial direction and is driven by a Z-axis moving mechanism 16 for selective advance or retraction. The tool post 7 preferably includes a turret and is disposed on the axial direction tailstock 27B for rotation about the horizontal axis T of rotation along the X-axis direction. The basic structure of the machine tool main body 1 other than those described above are preferably identical with those shown in and described in connection with any one of the previously described first and second preferred embodiments and therefore, like components thereof are designated by like reference numerals while the details thereof are not reiterated for the sake of brevity.

Even in the machine tool according to the third preferred embodiment, the machine tool main body 1 is provided with the spindle side position measuring unit 20 and the tool side position measuring unit 30.

The spindle side position measuring unit 20 is arranged to measure the position of the axis O of the spindle in the spindle radial direction (X-axis direction) relative to the first reference position P1 and preferably includes the first scale 21 and the first readout unit 22. The first scale 21 preferably is a rod-shaped member, and includes a base end portion 21a fitted to a site of the headstock 5 at an area of the axis O of the spindle 6. The first scale 21 extends from the base end portion 21a along the spindle radial direction. Although the base end portion 21a of the first scale 21 is preferably fitted to, for example, an upper surface relative to the headstock 5, it may be fitted to a lower surface or a front surface, or within the headstock 5. A predetermined region of a surface of the first scale 21, which opposes the first readout unit 22, includes first calibrations 23 juxtaposed in the spindle radial direction. The region where the first calibrations 23 are located is similar to that region where the first calibrations 23 in the previously described first preferred embodiment are located. The first readout unit 22 is arranged to read out the first calibrations 23 on the first scale 21 and is fixed in position at the first reference position P1, which will be a position on the machine bed 3, through a mounting member 24.

The tool side position measuring unit 30 is arranged to detect the position of the tool post 7 in the spindle radial direction (X-axis direction) relative to the second reference position P2 and includes the second scale 31 and the second readout unit 32. The second scale 31 preferably is a rod-shaped member and includes a base end portion 31a fitted to a center of the tool post 7 and extends from the base end portion 31a through the hollow shaft 7c along the spindle radial direction. On a tip end portion of the second scale 31, which protrudes outwardly from the hollow shaft 7c, second calibrations 33 juxtaposed in the spindle radial direction are preferably arranged over the entire periphery thereof. The second scale 31 is rotatable together with a tool post main body 7b. The second readout unit 32 is arranged to read the second calibrations 33 on the second scale 31 and is disposed at the second reference position P2. This second reference position P2 is, in the instance now under discussion, allocated to a particular position of the fixed position relative to the axial direction tailstock 27B and the second readout unit 32 is fixed to the second reference position P2 on the axial direction tailstock 27B through a mounting member 34B. The particular position referred to above is preferably an arbitrarily chosen position, which is fixed in position relative to the axial direction tailstock 27B, but in the present preferred embodiment, it is preferably the same X direction position as the first reference position P1.

Even in the present preferred embodiment, in a manner similar to that in any one of the previously described preferred embodiments, the value read out respectively by the first and second readout units 22 and 32 are inputted to the calculating block 40 and the relative distance L between the spindle axis and the cutter edge, in which the change in dimension resulting from the thermal displacement has been added to the relative distance L0 between the spindle axis and the cutter edge during the normal temperature, can be obtained, by allowing the calculating block 40 to perform the calculation process similar to that described previously. Also, by performing the correction using the thermal displacement corrector 43 with the use of the relative distance L between the spindle axis and the cutter edge referred to above, accurate correction can be accomplished in dependence on the thermal displacement and the processing accuracy is therefore increased.

Figure 9:
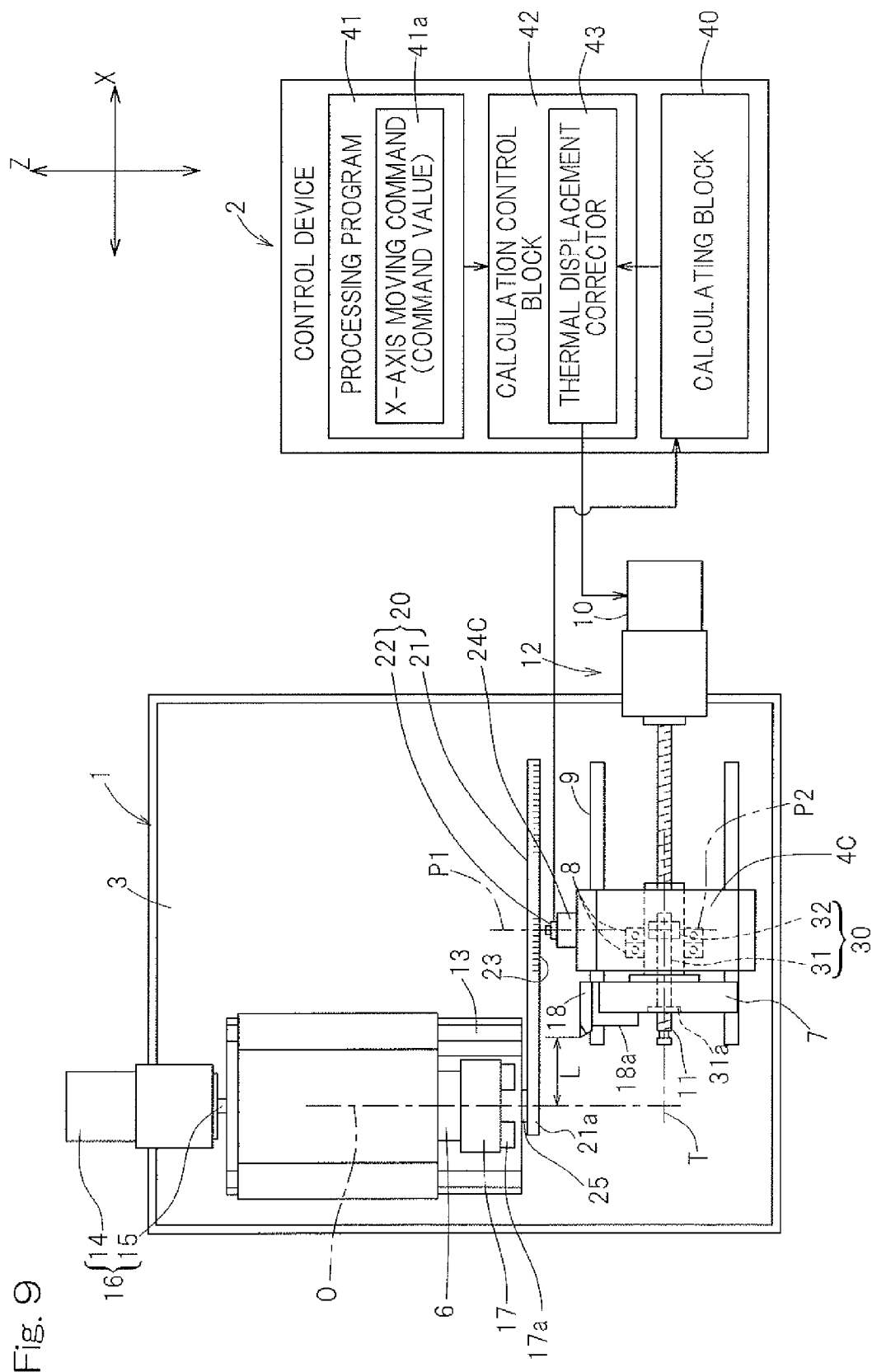
FIG. 9 is an explanatory diagram illustrating a top plan view of the machine tool main body in the machine tool, in accordance with a fourth preferred embodiment of the present invention, shown together with a block diagram of the conceptual structure of the control device.

FIG. 9 illustrates a fourth preferred embodiment of the present invention. Although the machine tool main body 1 of the machine tool designed according to the fourth preferred embodiment preferably is a turning machine of the type in which the headstock and the tool post are movable, in contrast to those in the previously described third preferred embodiment, the headstock 5 is provided on the machine bed 3 to move in the spindle axial direction (Z-axis direction) and the tool post 7 is provided on the machine bed 3 to move in the spindle radial direction (X-axis direction) through a radial direction tailstock 4C. The headstock 5 is disposed on the Z-axis guide 13, provided on the machine bed 3, to move in the spindle axial direction and is driven by the Z-axis moving mechanism 16 for selective advance or retraction. The radial direction tailstock 4C is disposed to move in the horizontal spindle radial direction on the X-axis guide 9, provided on the machine bed 3, and is driven by the X-axis moving mechanism 12 for selective advance or retraction. The tool post 7 preferably includes a turret and is installed on the radial direction tailstock 4C for rotation about the horizontal axis T of rotation along the X-axis direction. The basic structure of the machine tool main body 1 other than those described above are preferably identical with those shown in and described in connection with any one of the previously described first to third preferred embodiments and therefore, like components thereof are designated by like reference numerals while the details thereof are not reiterated for the sake of brevity.

Even in the machine tool according to the fourth preferred embodiment, the machine tool main body 1 is preferably provided with the spindle side position measuring unit 20 and the tool side position measuring unit 30.

The spindle side position measuring unit 20 is arranged to measure the position of the axis O of the spindle in the spindle radial direction (X-axis direction) relative to the first reference position P1 and preferably includes the first scale 21 and the first readout unit 22. The first scale 21 preferably is a rod-shaped member, and includes a base end portion 21a fitted to a site of the machine bed 3 at an area of the axis O of the spindle 6. The first scale 21 extends from this base end portion 21a along the spindle radial direction. A predetermined region of a surface of the first scale 21, which opposes the first readout unit 22, preferably includes first calibrations 23 juxtaposed in the spindle radial direction. The first readout unit 22 is arranged to read out the first calibrations 23 on the first scale 21 and is fixed in position at a particular position of the radial direction tailstock 4C, which will become the first reference position P1, through the mounting member 24C. Accordingly, in the present preferred embodiment, the first reference position P1 is movable and moves together with the radial direction tailstock 4C. The particular position of the radial direction tailstock 4C referred to above is rendered to be, for example, a center position of the radial direction tailstock 4C with respect to the X-axis direction width.

Figure 10:
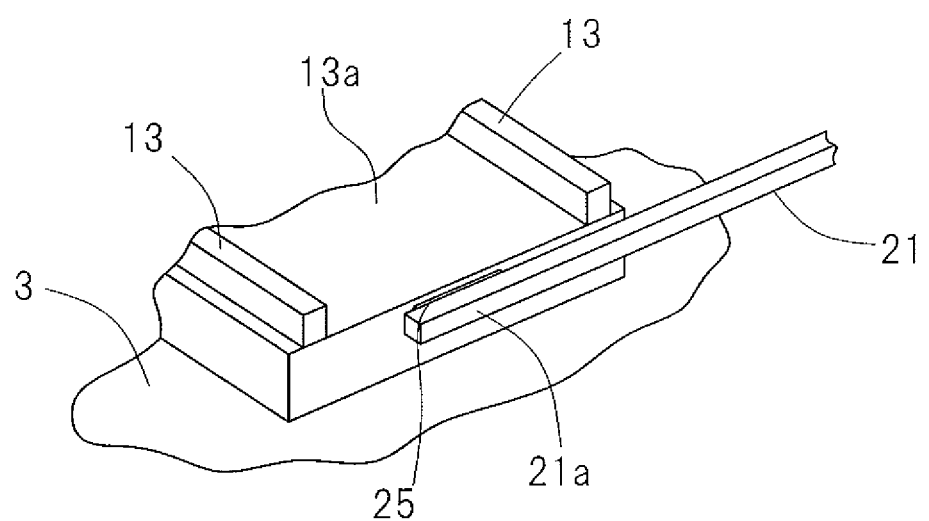
FIG. 10 is a perspective view illustrating a portion of the machine tool.

In the instance as shown, as best shown in FIG. 10, a pair of Z-axis guides 13 are provided on a plate-shaped base member 13a fixed to the machine bed 3 and the base end portion 21a of the first scale 21 is fitted to a front surface of the base member 13a through a spacer member 25. It is, however, to be noted that the base end portion 21a of the first scale 21 may be fitted to an upper surface of the base member 13a. In those cases, the base member 13a defines a portion of the machine bed 3 and the machine bed 3 is preferably constituted by a machine bed main body and the base member 13a provided thereon. It is, however, to be noted that without the base member 13a, the base end portion 21a of the first scale 21 may be fitted directly to the machine bed 3.

The tool side position measuring unit 30 is arranged to detect the position of the tool post 7 in the spindle radial direction (X-axis direction) relative to the second reference position P2 and preferably includes the second scale 31 and the second readout unit 32. The second scale 31 preferably is a rod-shaped member and includes a base end portion 31a fitted to the tool post 7 and extends from the base end portion 31a in the spindle radial direction. A predetermined region of a surface of the second scale 31, which opposes the second readout unit 32, preferably includes second calibrations 33 juxtaposed in the spindle radial direction. The region where the second calibrations 33 are located is similar to that region where the second calibrations 33 in the previously described first preferred embodiment are located. The second readout unit 32 is arranged to read out the second calibrations 33 on the second scale 31 and is disposed at the second reference position P2. In the fourth preferred embodiment, the second reference position P2 is preferably defined at a particular position on the tool post 7 and the second readout unit 32 is fixed either directly or through a mounting member (not shown) to the tool post 7. The particular position referred to above is preferably an arbitrarily chosen position on the tool post 7, but in the present preferred embodiment preferably is the same X-direction position as the first reference position P1.

Even in the present preferred embodiment, in a manner similar to that in any one of the previously described preferred embodiments, the values read out respectively by the first and second readout units 22 and 32 are preferably inputted to the calculating block 40 and the relative distance L between the spindle axis and the cutter edge, in which the change in dimension resulting from the thermal displacement has been added to the relative distance L0 between the spindle axis and the cutter edge during the normal temperature, can be obtained, by allowing the calculating block 40 to perform the calculation process similar to that described previously. Also, by performing the correction via the thermal displacement corrector 43 with the use of the relative distance L between the spindle axis and the cutter edge referred to above, accurate correction can be accomplished in dependence on the thermal displacement and the processing accuracy is therefore increased.

It is noted that in any one of the foregoing preferred embodiments, the spindle side position measuring unit 20 preferably has a structure in which the first readout unit 22 is provided at the first reference position P1 and the base end portion 21a of the first scale 21 is arranged at an area of the spindle axis O, but in a fashion reverse thereto, the base end portion 21a of the first scale 21 may be provided at the first reference position P1 and the first readout unit 22 may then be arranged at an area of the spindle axis O. Even with respect to the tool side position measuring unit 30, in any one of the foregoing preferred embodiments, the second readout unit 32 is provided at the second reference position P2 and the base end portion 31a of the second scale 31 is provided on the tool post 7, but in a fashion reverse thereto, the base end portion 31a of the second scale 31 may be provided at the second reference position P2 and the second readout unit 32 may then be provided on the tool post 7.

In addition, although in describing any one of the foregoing preferred embodiments, the calculating block 40 has been shown and described as preferably being arranged to calculate the relative distance L between the spindle axis and the cutter edge, the calculating block 40 need not necessarily calculate the relative distance L between the spindle axis and the cutter edge, but may calculate the value to be used in correcting the amount of movement of the headstock 5 and the tool post 7 in the spindle radial direction, for example, the amount of correction relative to the feed amount command value. Since even in such case both of the spindle axis position O and the position of the tool post 7 are rendered to be calculated, highly accurate correction can be accomplished, and as a result, the relative distance between the spindle axis and the cutter edge can be controlled accurately, thereby increasing the processing accuracy.

Furthermore, although in describing any one of the foregoing preferred embodiments, the tool post 7 has been shown and described as preferably being a tool post of a turret type, the tool post 7 may be of any other types such as, for example, a comb type.

The machine tool referred to in describing any one of the foregoing preferred embodiments has been shown and described preferably as a turning machine, but the present invention can be equally applicable even where the machine tool is, for example, a drilling machine, a cutting machine or the like.

Figure 11:
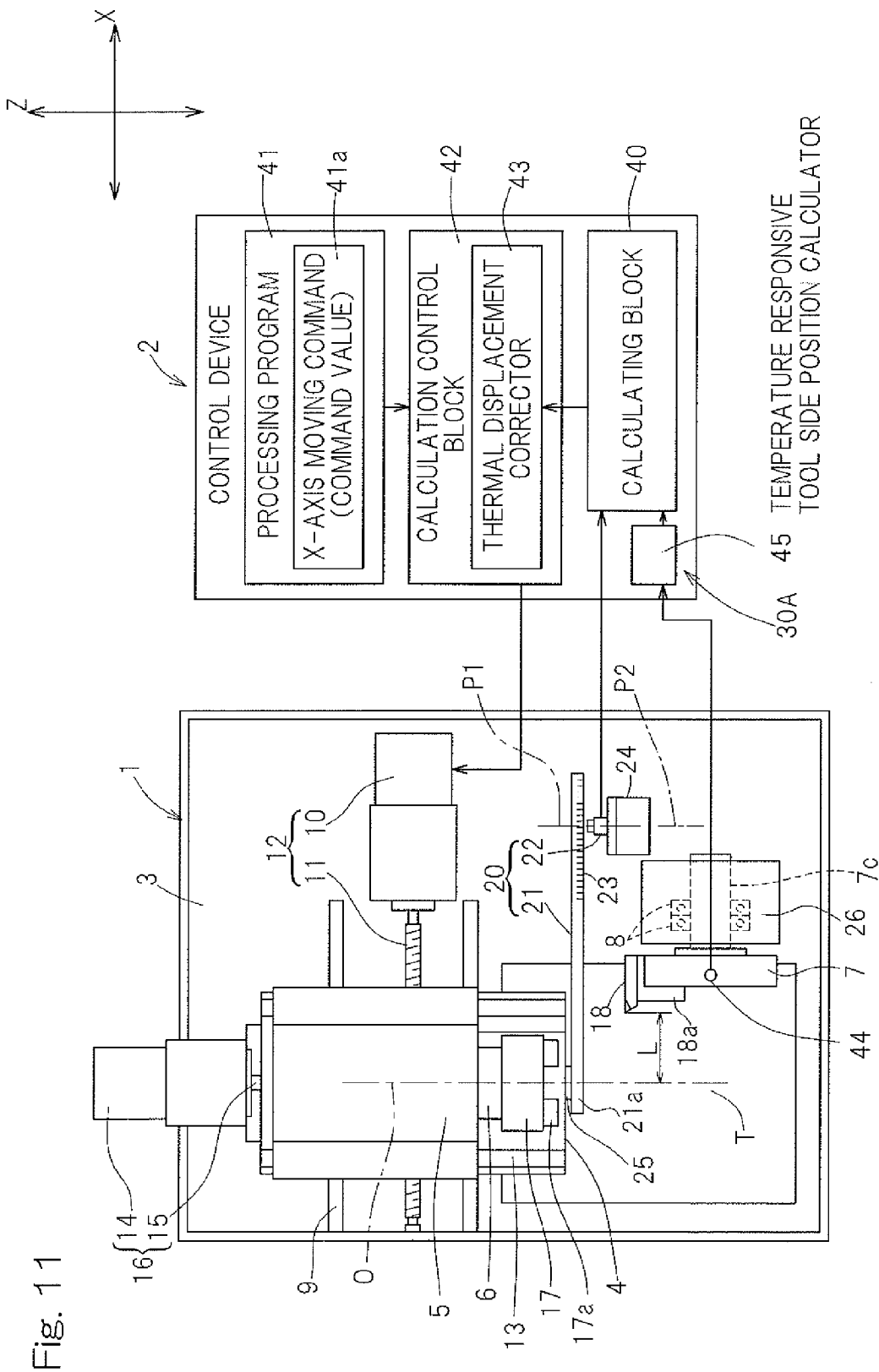
FIG. 11 is an explanatory diagram illustrating a top plan view of the machine tool main body in the machine tool, in accordance with a fifth preferred embodiment of the present invention, shown together with a block diagram of the conceptual structure of the control device.
Figure 12:
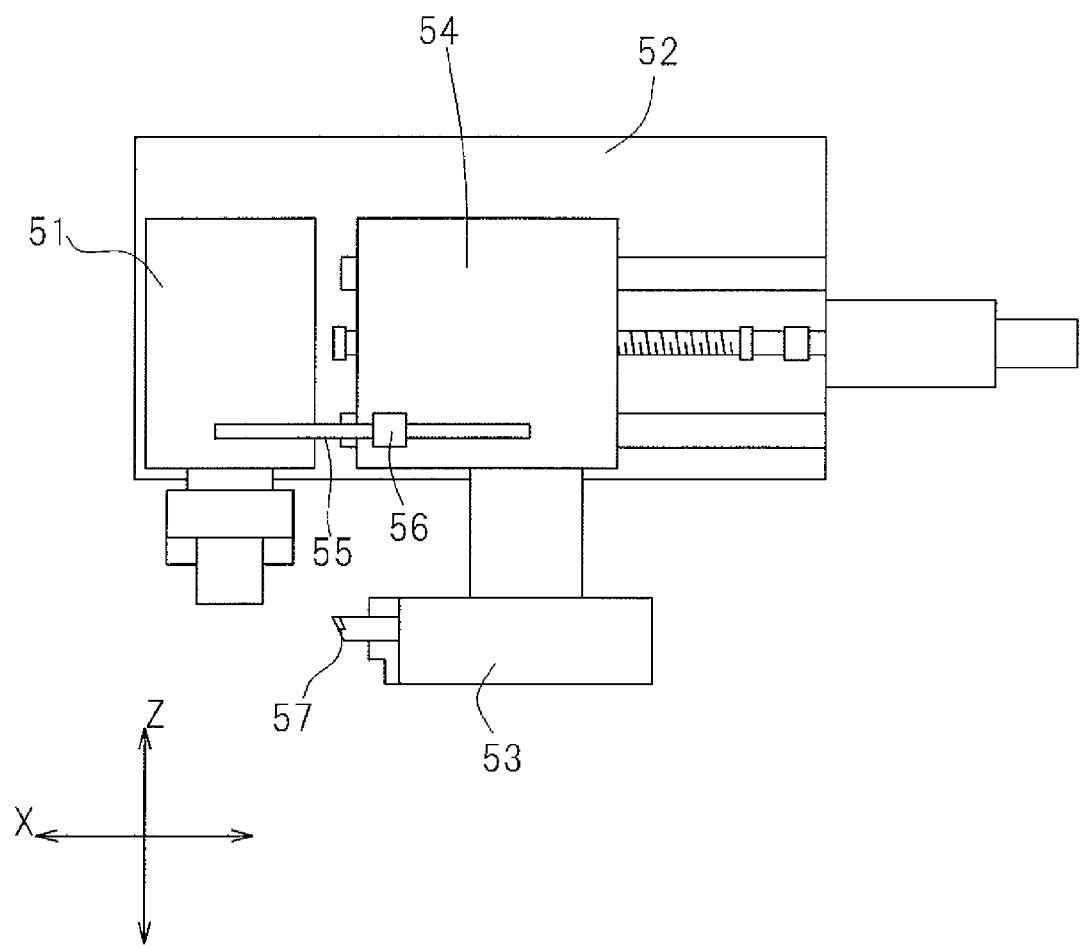
FIG. 12 is a top plan view illustrating the machine tool main body in a conventional machine tool.

FIG. 11 illustrates a fifth preferred embodiment of the present invention. The fifth preferred embodiment is preferably similar to the first preferred embodiment shown in and described with particular reference to FIGS. 1 to 6, but differs therefrom in that, in place of the tool side position measuring unit 30 of the structure including the second scale 31 and the second readout unit 32, use is made of a tool side position measuring unit 30A that includes a temperature measuring unit 44 and a temperature responsive tool side position calculator 45 as shown in FIG. 11. The temperature measuring unit 44 referred to above is arranged to measure the temperature of the tool post 7 and preferably includes a thermometer such as, for example, a thermocouple. The temperature responsive tool side position calculator 45 is arranged to calculate the position of the tool post 7 in the spindle radial direction relative to the second reference position P2 from a measured temperature value of the temperature measuring unit 44.

The temperature responsive tool side position calculator 45 has a relationship setting unit (not shown) including, for example, tables or arithmetic equations setting relationships between the positions of the temperature measuring unit 44 and the tool post 7 in the spindle radial direction, and is arranged to calculate the position of the tool post 7 in the spindle radial direction from the relation, set in the relationship setting unit, and the measured temperature value of the temperature measuring unit 44. The table or arithmetic equations set in the relationship setting unit referred to above are rendered to be determined via a series of experiments and/or simulations. The temperature responsive tool side position calculator 45 is provided in, for example, the control device 2 and a calculated value thereof is inputted to the calculating block 40 as a result of calculation performed by the tool side position measuring unit 30A. The second reference position P2 is, for example, the same spindle radial direction position as the first reference position P1 on the machine bed 3. Other structural features of this fifth preferred embodiment than those described above are preferably identical with those shown in and included in the practice of the previously described first preferred embodiment.

Since the position of the tool post 7 and the temperature thereof has a certain settled relationship, even the measurement of the temperature in the manner described above is effective to allow the spindle radial direction position of the tool post 7 to be determined accurately. For this reason, even in the fifth preferred embodiment, by measuring both of the axial position of the spindle 6 and the position of the tool post 7, the relative distance between the spindle axis and the cutter edge can be measured accurately by measuring both of the axis position of the spindle 6 and the position of the tool post 7.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A machine tool which comprises:
   a headstock arranged to rotatably support a spindle including a tip provided with a chuck to hold a work;
   a tool post having a tool fitted thereto;
   a machine bed on which the headstock and the tool post are arranged to move relative to each other in a spindle radial direction and a spindle axial direction;
   a spindle side position measuring unit including a first scale extending in the spindle radial direction, and a first readout unit arranged to read the first scale and to measure a spindle axial position in the spindle radial direction relative to a first reference position, one of a base end portion of the first scale and the first readout unit being provided on a portion of the headstock or a member that is movable in the spindle radial direction together with the headstock in an area of the spindle axis in the spindle radial direction, and the other of the base end of the first scale and the first readout unit being provided at the first reference position;
   a tool side position measuring unit including a second scale extending in the spindle radial direction, and a second readout unit arranged to read the second scale and to measure the position of the tool post relative to a second reference position, one of a base end portion of the second scale and the second readout unit being provided on the tool post or a member that is movable together with the tool post in the spindle radial direction, and the other of the base end portion of the second scale and the second readout unit being provided at the second reference position;
   the first reference position and the second reference position being fixed in position relative to the spindle radial direction; and
   a calculating block arranged to calculate a relative distance between a spindle axis and a cutter edge that corresponds to a distance between the spindle axis and the cutter edge in the spindle radial direction, or to calculate a value that is used in correcting an amount of relative movement between the headstock and the tool post in the spindle radial direction based on a reading of the spindle side position measuring unit and a reading of the tool side position measuring unit.

2. The machine tool as claimed in claim 1, further comprising:

a tailstock provided on the machine bed to move in the spindle radial direction; wherein the headstock is mounted on the tailstock to move in a spindle axial direction and the tool post is fixed to the machine bed;

one of the base end portion of the first scale and the first readout unit is provided on the tailstock at an area of the spindle axis in the spindle radial direction and the other of the base end portion of the first scale and the first readout unit is provided on the machine bed at the first reference position; and one of the base end portion of the second scale and the second readout unit is fitted to the tool post and the other of the base end portion of the second scale and the second readout unit is provided at the second reference position that is fixed in position to the machine bed.

3. The machine tool as claimed in claim 1, wherein the headstock is provided on the machine bed and fixed in position thereto, the tool post is disposed on the machine bed through a radial direction tailstock and an axial direction tailstock, the radial direction tailstock is provided on the machine bed to move in the spindle radial direction, the axial direction tailstock is mounted on the radial direction tailstock to move in a spindle axial direction, and the tool post is mounted on the axial direction tailstock;

one of the base end portion of the first scale and the first readout unit is disposed on the headstock at an area of the spindle axis in the spindle radial direction and the other of the base end portion of the first scale and the first readout unit is provided at the first reference position which will become a position on the radial direction tailstock; and one of the base end portion of the second scale and the second readout unit is fitted to the tool post and the other of the base end portion of the second scale and the second readout unit is provided at the second reference position which will become a position on the axial direction tailstock.

4. The machine tool as claimed in claim 1, wherein the headstock is provided on the machine bed to move in the spindle radial direction and the tool post is mounted on an axial direction tailstock provided on the machine bed to move in the spindle axial direction;

one of the base end portion of the first scale and the first readout unit is provided on the headstock at an area of the spindle axis in the spindle radial direction, and the other of the base end portion of the first scale and the first readout unit is provided at the first reference position fixed in position thereto; and one of the base end portion of the second scale and the second readout unit is fitted to the cutter block, and the other of the base end portion of the second scale and the second readout unit is provided at the second reference position which will become a position on the axial direction tailstock.

5. The machine tool as claimed in claim 1, wherein the headstock is provided on the machine bed to move in the spindle axial direction and the tool post is mounted on a radial direction tailstock that is disposed on the machine bed to move in the spindle radial direction;

one of the base end portion of the first scale and the first readout unit is provided on the headstock at an area of the spindle axis in the spindle radial direction, and the other of the base end portion of the first scale and the first readout unit is provided at the first reference position which will become a position on the radial direction tailstock; and one of the base end portion of the second scale and the second readout unit is fitted to the tool post, and the other of the base end portion of the second scale and the second readout unit is provided at the second reference position which will become a position on the radial direction tailstock.

6. The machine tool as claimed in claim 2, wherein the first scale of the spindle side position measuring unit includes first calibrations within a region extending from a position that the first readout unit corresponds to when the headstock is positioned at a position where a cutter edge of the tool on the tool post contacts an outer diameter of a work held by the chuck and having the largest possible diameter that can be processed, to a position of origin that the first readout unit corresponds to when an axis of the spindle assumes the same spindle radial direction position as the cutter edge of the tool.

7. The machine tool as claimed in claim 4, wherein the first scale of the spindle side position measuring unit includes first calibrations within a region extending from a position that the first readout unit corresponds to when the headstock is positioned at a position where a cutter edge of the tool on the tool post contacts an outer diameter of a work held by the chuck and having the largest possible diameter that can be processed, to a position of origin that the first readout unit corresponds to when an axis of the spindle assumes the same spindle radial direction position as the cutter edge of the tool.

8. The machine tool as claimed in claim 3, wherein the first scale of the spindle side position measuring unit includes first calibrations within a region extending from a position that the first readout unit corresponds to when the tailstock is positioned at a position where a cutter edge of the tool on the tool post contacts an outer diameter of the work held by the chuck and having the largest possible diameter that can be processed, to a position of origin that the first readout unit corresponds to when an axis of the spindle assumes the same spindle radial direction position as the cutter edge of the tool.

9. The machine tool as claimed in claim 5, wherein the first scale of the spindle side position measuring unit includes first calibrations within a region extending from a position that the first readout unit corresponds to when the tailstock is positioned at a position where a cutter edge of the tool on the tool post contacts an outer diameter of the work held by the chuck and having the largest possible diameter that can be processed, to a position of origin that the first readout unit corresponds to when an axis of the spindle assumes the same spindle radial direction position as the cutter edge of the tool.

10. The machine tool as claimed in claim 1, further comprising:

a control device arranged and programmed to move the tool post relative to the headstock in accordance with a command value of a moving command; and a thermal displacement corrector provided in the control device to perform a correction in response to the command value based on the relative distance between the spindle axial position and the cutter edge determined by the calculating block.

11. A machine tool comprising:

a headstock arranged to rotatably support a spindle including a tip provided with a chuck to hold a work;

a tool post having a tool fitted thereto;

a machine bed on which the headstock and the tool post are arranged to move relative to each other in a spindle radial direction and a spindle axial direction;

a spindle side position measuring unit including a first scale extending in the spindle radial direction, and a first readout unit arranged to read the first scale and to measure a spindle axial position in the spindle radial direction relative to a first reference position, one of a base end portion of the first scale and the first readout unit being provided on a portion of the headstock or a member that is movable in the spindle radial direction together with the headstock in an area of the spindle axis in the spindle radial direction, and the other of the base end of the first scale and the first readout unit being provided at the first reference position;

a tool side position measuring unit arranged to measure the position of the tool post relative to a second reference position in the spindle radial direction;

the first reference position and the second reference position being fixed in position relative to the spindle radial direction; and a calculating block arranged to calculate a relative distance between a spindle axis and a cutter edge that corresponds to a distance between the spindle axis and the cutter edge in the spindle radial direction, or to calculate a value that is used in correcting an amount of relative movement between the headstock and the tool post in the spindle radial direction based on a reading of the spindle side position measuring unit and a reading of the tool side position measuring unit.

\* \* \* \* \*